United States Patent [19]
Nye

[11] Patent Number: 5,280,579
[45] Date of Patent: Jan. 18, 1994

[54] MEMORY MAPPED INTERFACE BETWEEN HOST COMPUTER AND GRAPHICS SYSTEM

[75] Inventor: Jeffrey L. Nye, Houston, Tex.

[73] Assignee: Texas Instruments Incorporated, Dallas, Tex.

[21] Appl. No.: 590,093

[22] Filed: Sep. 28, 1990

[51] Int. Cl.$^5$ ............................................. G06F 15/00
[52] U.S. Cl. .................................. 395/166; 395/164; 395/162
[58] Field of Search ............... 395/162, 164, 166, 200; 340/747, 750, 798, 799

[56] References Cited

U.S. PATENT DOCUMENTS 4,620,289  10/1986  Chauvel ............................ 369/521
4,829,455  5/1989  Long et al. .......................... 364/521

Primary Examiner—Phu K. Nguyen
Attorney, Agent, or Firm—Robert D. Marshall, Jr.; James C. Kesterson; Richard L. Donaldson

[57] ABSTRACT

An apparatus for graphics software development for execution in a graphics processor. The graphics processor resides in a host computer, which has a system bus and a video graphics array (VGA) for video enhanced display. The apparatus comprises a memory mapper coupled to the system bus for providing interface between the host computer and the apparatus, and a memory storage circuit coupled to the graphics processor for providing local memory space for storing data and access of the stored data. A video pass through multiplexer allows either the output of the memory storage circuit or the output of the VGA to be viewed on one monitor.

26 Claims, 2 Drawing Sheets

MEMORY MAPPED INTERFACE BETWEEN HOST COMPUTER AND GRAPHICS SYSTEM

TECHNICAL FIELD OF THE INVENTION

This invention relates in general to the field of graphics systems. More particularly, the present invention relates to apparatus and method for graphics software development.

BACKGROUND OF THE INVENTION

The computer age has brought forth microprocessors that can be accommodated in one integrated circuit package or on a chip. Some of these microprocessors serve general purpose functions that are capable of executing a myriad of software, such as a central processing unit in a personal computer. Certain other microprocessors have specialized applications, such as those which compute the Fourier Transform and the like.

One specialized microprocessor is the processor dedicated to generation of graphics. It may have a particular architecture, specialized logic, or micro instructions that facilitates the production and display of graphics designs.

One such graphics processor is the TM34020 manufactured by Texas Instruments Incorporated of Dallas, Tex. The TM34020 features specialized hardware and an instruction set that provide special graphics operations. However, in order to thoroughly exploit the features of the TM34020, a software development support tool must be provided to users who wish to develop application graphics software for the TM34020 graphics system processor.

Accordingly, a need has arisen for apparatus and method for graphics software development in support of a specialized graphics processor.

SUMMARY OF THE INVENTION

In accordance with the present invention, apparatus and a method for are provided which substantially eliminate or reduce disadvantages and problems associated with prior circuits.

In one aspect of the present invention, an apparatus for graphics software development for execution in a graphics processor is provided. The graphics processor resides in a host computer, which has a system bus and a video graphics array (VGA) for video enhanced display. The apparatus comprises memory mapping means coupled to the system bus for providing interface between the host computer and the apparatus, and a memory storage circuit coupled to the graphics processor for providing local memory space for storing data and access to the stored data. A video pass through means further allows either the output of the memory storage circuit or the output of the VGA to be viewed on one monitor.

In another aspect of the present invention, a method for interface between a host computer and a processor residing therein is provided. The method comprises the steps of determining the address of a block of predetermined amount of memory space in the system bus memory and storing the determined address. Thereafter, the local memory space is mapped into the system bus memory space in response to the determined address stored in the base register.

In yet another aspect of the present invention, a method for video pass through in a graphics system having a video graphics array (VGA) and local memory space is provided. The method comprises the steps of connecting a monitor to a palette circuit, and multiplexing one of the output from the VGA and the local memory space to the palette circuit.

An important technical advantage of the present invention provides apparatus and method for graphics software development in support of a specialized graphics processor.

Another important technical advantage of the present invention provides for apparatus and method for memory mapped interface.

Yet another important technical advantage of the present invention provides for apparatus and method for using one monitor to display both VGA and video data.

BRIEF DESCRIPTION OF THE DRAWINGS

For a better understanding of the present invention, reference may be made to the accompanying drawings, in which.

DETAILED DESCRIPTION OF THE INVENTION

Figure 1:
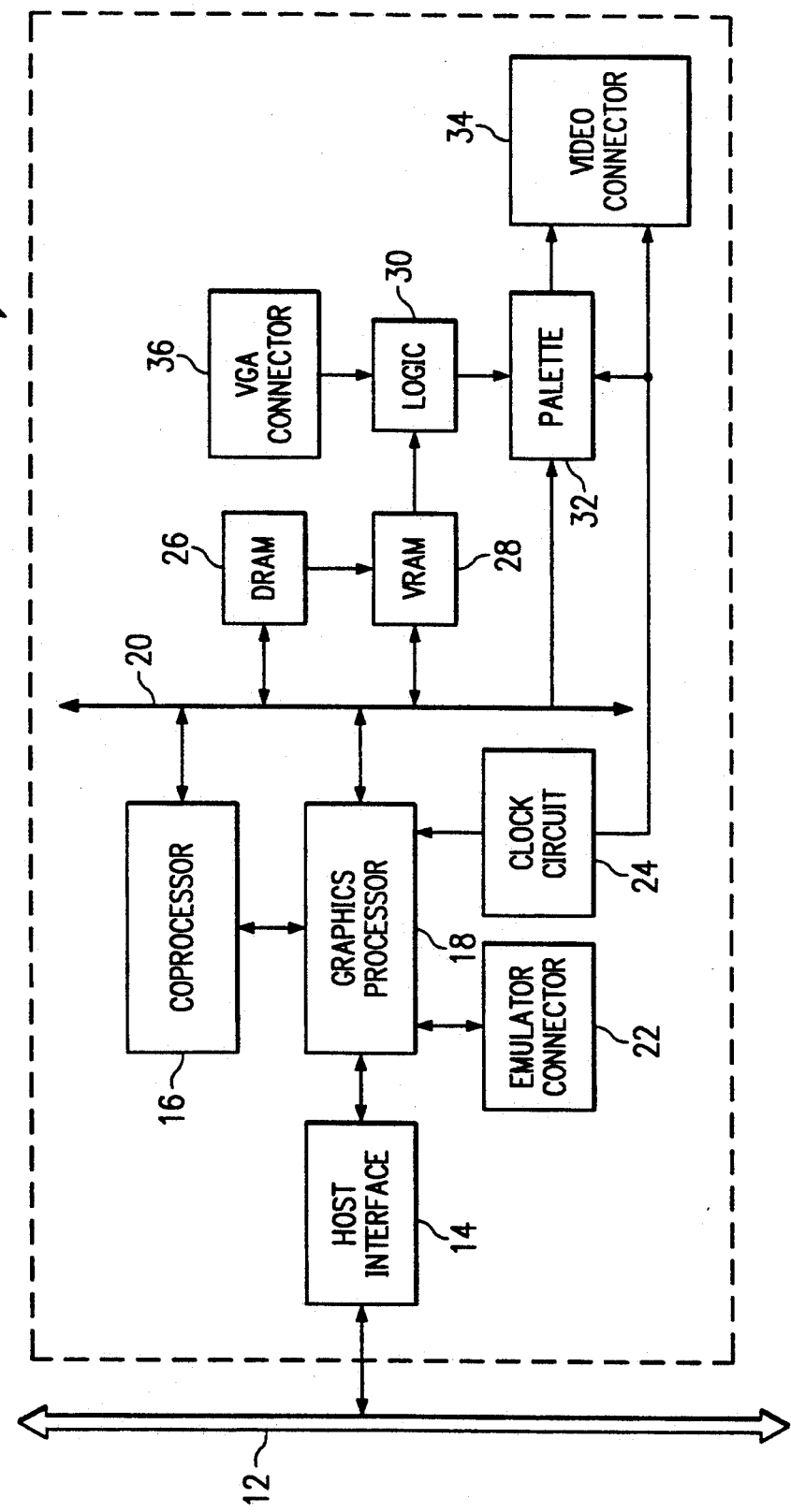
FIG. 1 is a top level block diagram of the preferred embodiment of the present invention.

With reference to the drawings, FIG. 1 illustrates a preferred embodiment of apparatus for graphics software development, indicated generally at 10 and constructed according to the teaching of the present invention. Graphics software apparatus 10 is typically embodied in a printed circuit board coupled to the host central processing unit (CPU; not shown) of a personal computer (not shown) via an expansion slot connection (not shown).

Apparatus 10 is therefore coupled to a system bus 12, such as an ISA bus in an IBM personal computer, for communication with the host CPU. A host interface 14 is coupled directly with system bus 12 and a graphics processor 18. A coprocessor 16 is further connected to graphics processor 18. Both graphics processor 18 and coprocessor 16 are coupled to a local bus 20. Graphics processor 18 and coprocessor 16 may be implemented with integrated circuits TM34020 and TM34082, both manufactured by Texas Instruments.

A connector 22 which provides coupling between graphics processor 18 and an emulator (not shown) is coupled to graphics processor 18. Additionally, a clock circuit 24 is coupled to graphics processor 18 and a number of other circuit blocks to be described below.

Local bus 20 is coupled to memory components DRAM (dynamic random access memory) 26 and VRAM (video random access memory) 28. A connection between DRAM 26 and VRAM 28 is also provided. A logic circuit 30 is further coupled to VRAM 28, which is in turn connected to a VGA connector 36. Logic circuit 30 is also coupled to a palette circuit 32. Palette circuitry 32 is also coupled to local bus 20 and clock circuit 24. A video connector 34 is coupled to palette circuit 32 and clock circuit 24.

In operation, host interface 14 provides handshaking, address decoding, and a bidirectional path for the transfer of data between system bus 12 and apparatus 10. In particular, graphics processor 18 transmits and receives data to and from the host CPU via host interface 14.

Clock circuit 24 generates and provides clock and timing signals of predetermined frequencies to graphics processor 18. Graphics processor 18 and coprocessor 16 may also communicate with an emulator board via emulator connector 22. DRAM 26 and VRAM 28 provide storage and random access of stored data to graphics processor 18, coprocessor 16 and palette circuit 32 (via logic circuit 30). VGA connector 36 provides a path between apparatus 1? and a conventional VGA board (not shown). Palette circuit 32 may receive video data from VRAM 28 or VGA via logic circuit 30. A video monitor may be coupled to video connector 34 to display the graphics images.

Figure 2:
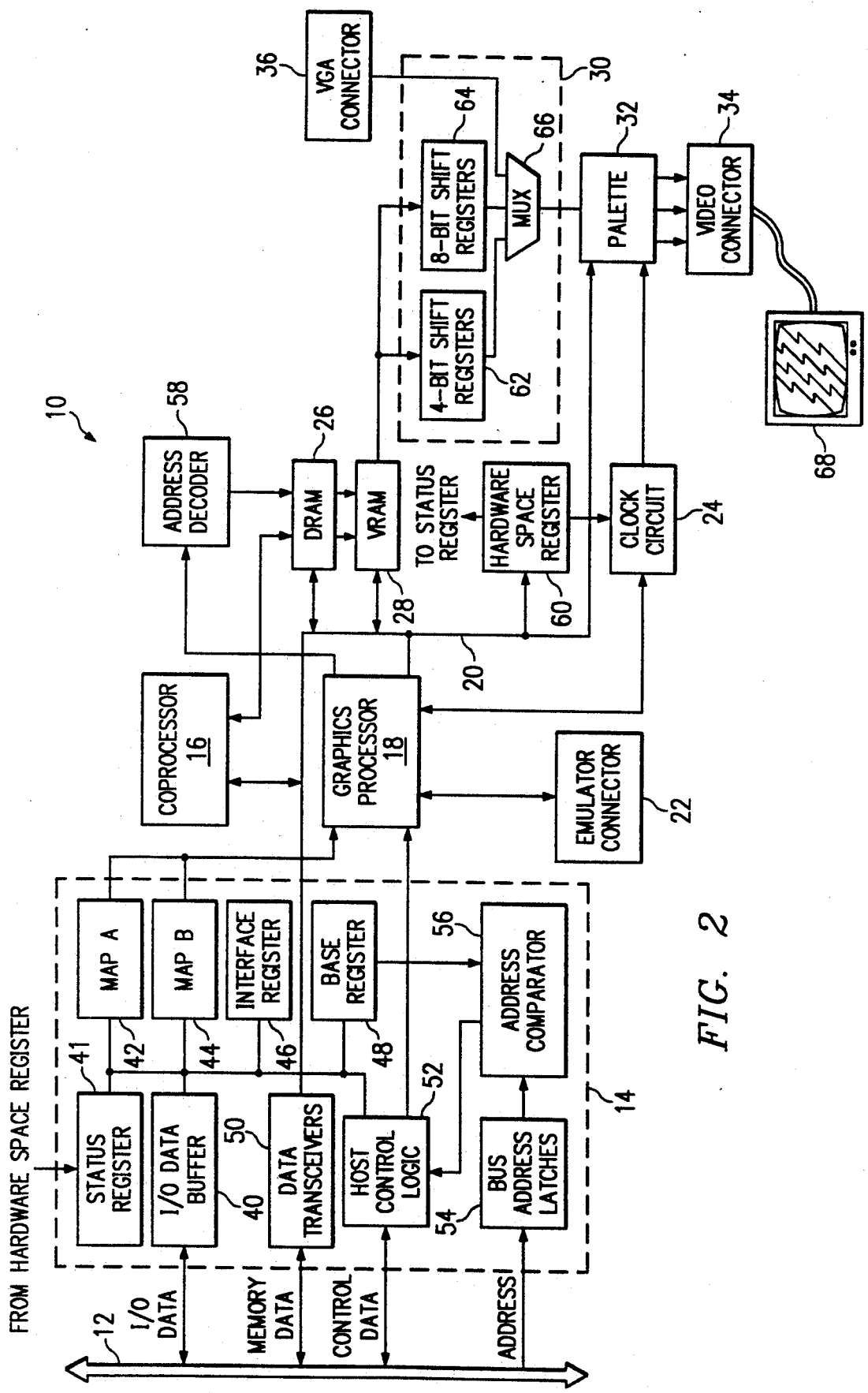
FIG. 2 is a more detailed block diagram of the present invention.

Referring to FIG. 2, where like numerals refer to like elements, host interface 14 is shown having several functional components. An I/O (input/output) data buffer 40 is coupled to system bus 12. I/O data buffer 40, in turn, is coupled to a status register 41, a map A register 42, a map B register 44, an interface register 46, and a base register 48. Map A and B registers 42 and 44 are also coupled to graphics processor 18.

Data transceivers 50 and host control logic 52 are also coupled to system bus 12. Host control logic 52 in turn has a control data path to graphics processor 18. A set of bus address latches 54 are coupled to system bus 12 and an address comparator 56. Address comparator 56 is also coupled to host control logic 52 and base register 48.

An address decoder 58 is coupled between graphics processor 18 and DRAM 26. Also coupled to local bus 20 is a hardware space register 60, which is also coupled to status register 41 and clock circuit 24.

Logic circuit 30 contains 4-bit shift registers 62, coupled to VRAM 28, and 8-bit shift registers 64 also coupled to VRAM 28. Further included is a multiplexor (MUX) 66, the inputs of which are coupled to the serial outputs of both shift registers 62 and 64, and to VGA connector 36. The output of MUX 66 is coupled to palette circuit 32.

In operation, host interface circuits 14 provide a control and data path for accesses to and from system bus 12 and support either 8-bit or 16-bit I/O (input/output) data transfers.

Host interface 14 includes I/O data buffers 40, which are adapted to receive and transmit I/O read and write data between system bus 12 and apparatus 10. Similarly, bus address latches 54 receive and latch the current bus cycle address on system bus 12. The current bus cycle address is used by apparatus 10 to derive the address used locally for the purpose of accessing VRAM 28 and DRAM 26. In addition, data transceivers 50 provide a bidirectional memory data path between apparatus 10 and system bus 12.

Host interface 14 also includes address comparator 56, which receives and compares the programmed I/O address against the address provided on system bus 12 to generate a confirmation signal indicative of a match therebetween, which is provided to host control logic 52.

Interface register 46 of host interface 14 determines how apparatus 10 may respond to system bus cycles. In the preferred embodiment of the present invention, interface register 46 is an 8-bit register. The logic value of one predetermined bit position in the register indicates whether apparatus 10 is enabled to respond to memory accesses. Another bit is indicative of whether 8- or 16-bit data transfers are allowed. A third bit disables direct palette accesses on write operations. A fourth bit position resets hardware space register 60, interface register 46 and graphics processor 18. A fifth bit position value determines whether apparatus 10 responds to the upper or lower half of the memory block with base address determined by base register 48 (function thereof described below). These bit values are made available to host control logic 52.

In the preferred embodiment of the present invention, host control logic 52 is implemented with programmable array logic (PAL) technology. Host control logic 52 provides control logic for host interface for graphics processor 18 and generates control signals required by graphics processor 18 and other functional blocks. Host control logic 52 generates signals in order to select the appropriate input to apparatus 10, such as one of the host processor, system bus I/O space and VGA palette. Host control logic 52 also generates control signal sequences for registers A 42 and map register B 44, interface register 46, base register 48 and status register 41 in response to system bus I/O cycles. In addition, handshake signals between apparatus 10 and system bus 12 are generated herein.

Upon power-up, apparatus 10 configuration and initialization begins. A configuration procedure, which may be running on the host CPU, examines system bus memory space to look for a block of free space of a predetermined size. Once found, base register 48 is initialized with the base address of the free block of memory. This free space is a software selectable memory segment in system bus memory to which apparatus 10 may be mapped. Map register A 42 and map register B 44 each points to a predetermined block of local memory space in DRAM 26 or VRAM 28 and supplies either address to graphics processor 18 for access, thereof. Each block of local memory determined by map register A 42 and map register B 44 are mapped into the upper or lower half of the memory block occupied by apparatus 10 in system bus memory space. Implemented in this manner, the host processor may access the memory space of graphics processor 18 via its local memory space. Note that the local memory spaces pointed to by map register A 42 and map register B 44 may be contiguous, noncontiguous, or overlapping.

During a system bus cycle, address comparator 56 compares a predetermined set of address bits of the system bus address to the contents of base register 48. Another comparison is further made of another predetermined bit position in system bus address and the fifth predetermined bit value in interface register 46 which selects upper or lower half of memory block. If both comparisons yield matching values, then apparatus 10 is selected. Once apparatus 10 is selected, it uses yet another predetermined system bus address bit to enable either map register A 42 or map register B 44. In this manner, a predetermined block of system bus memory space is decoded and selected.

Address decoder 58 performs the function of decoding an address provided by graphics processor 18 and selects either DRAM 26, VRAM 28, hardware space register 60 or palette 32.

Hardware space register 60 may be implemented as a write-only register which serve as a graphics processor 18 configuration and mode controller programmable by graphics processor 18. In the preferred embodiment of the present invention, hardware space register 60 has four active bits and the logic level thereof sets one of four modes or configurations: VGA pass through feature, high or low resolution, 4-bit per pixel, or 8-bit per pixel. On power-up, hardware space register 60 preferably has a default setting of VGA pass through on, with low resolution, 4-bit and 8-bit per pixel selections off. The setting of hardware register 60 is reflected in the setting of status register 41, where graphics processor operation mode and configuration are made available.

Clock circuit 24 may be implemented with two oscillating crystals supplying base frequency requirements of 25 MHz and 64 MHz. The 25 MHz frequency is required by the 640×480 resolution and 64 MHz is required by the 1024×768 resolution. Dividers implemented by counter circuits are also provided to further decrease the signals to desired clock and timing signals. Such timing circuitry is known in the art.

Multiplexer 66 is adapted to receive outputs from 4-bit shift registers 62, 8-bit shift registers 64, or VGA connector 36. Upon power-up, the default setting provides multiplexer 66 to receive video signals from VGA connector 36, Which is connected to a VGA board, and pass the signals to palette 32. Palette 32 receives the signals and in turn drives monitor 68 through video connector 34. The data path from the VGA board through VGA connector 36 and multiplexer 66 to video connector 34 is a video pass through feature which enables one monitor to receive video signals to receive input from both the VGA board and graphics processor 18. This feature eliminates the need to connect two separate monitors to a graphics system having both a graphics processor and a VGA board.

In order to perform video pass through correctly, palette 32 must reflect all writes to the VGA palette (not shown). Address comparator 56 monitors system bus addresses for VGA access cycles and notifies host control logic 52 thereof. A write cycle is generated by graphics processor 18 and the write operation currently occurring on system bus 12 is copied or shadowed through data transceivers 50 and supplied to palette 32. Implemented in this manner, all VGA palette modifications are mirrored in palette 32 to ensure that colors in palette 32 match those in VGA palette. Preferably, palette 32 is implemented with the 66 MHz BT 478 manufactured by Brooktree.

Although the present invention has been described in detail, it should be understood that various changes, substitutions and alterations can be made hereto without departing from the spirit and scope of the present invention as defined by the appended claims.

What is claimed is:

1. A graphics system for connection to a host computer having a system bus for transmitting memory accesses via addresses within a predetermined system memory space, said graphics system comprising:
   a local memory for storing data at address location within a local memory space;
   a base register for storing a base address within the system memory space;
   an address comparator connected to the system bus and said base register for determining if an address on the system bus is within a predetermined block of addresses within the system memory space starting at said base address; and
   a host control logic circuit connected to the system bus, said local memory and said address comparator for coupling a memory access via the system bus to said local memory if said address comparator determines the address on the system bus is within said predetermined block of addresses starting at said base address.

2. The graphics as set forth in claim 1, further comprising:
   a first mapping register for storing a first address pointing to a first block of memory in said local memory space;
   a second mapping register for storing a second address pointing to a second block of memory in said local memory space; and
   means for mapping said first and second blocks of memory into corresponding first and second predetermined locations in said predetermined block of system memory space starting at said base address stored in said base register.

3. The graphics system as set forth in claim 2, wherein said first and second blocks of memory may be contiguous, noncontiguous, or overlapping.

4. The graphics system as set forth in claim 1, wherein:
   said address comparator compares a predetermined first set of address bits of the address on the system bus with a corresponding second set of bits stored in said base register and determines said address on the system bus is within said predetermined block of addresses starting at said base address only if said first and second sets of bits are identical.

5. The graphics system as set forth in claim 1, further comprising:
   an interface register having stored therein an indication of whether said graphics system is or is not to be responsive to the host system via the system bus; and
   said host control logic circuit is connected to said interface register for coupling a memory access via the system bus to said local memory only if said interface register stores an indication that said graphics system is to be responsive to the host system via the system bus.

6. The graphics system as set forth is claim 1, further comprising:
   an interface register having stored therein an indication of the data width of transfers between said graphics system and the system bus; and
   said host control logic circuit is connected to said interface register for enabling a memory access via the system bus having the data width indicated by said interface register.

7. The graphics system as set forth is claim 1, further comprising:
   an interface register having stored therein a one bit indication of whether said graphics system responds to an upper half or lower half of said predetermined block of addresses starting at said base address; and
   said address comparator is connected to said interface register and compares a predetermined bit of the address on the system bus with a said one bit of said interface register and determines said address on the system bus is within said predetermined block of addresses starting at said base address only if said predetermined bit of the address on the system bus matches said one bit of said interface register.

8. The graphics system as set forth is claim 1, wherein the host computer further includes a video display circuit generating digital video display signals for driving a monitor, said graphics system wherein:
   said local memory stores at predetermined addresses digital video display data corresponding to a video image;

said graphics system further comprises
a video input connector receiving the digital video display signals from said video display circuit;
a set of shift registers having an input coupled to said local memory for receiving digital video display data recalled from said local memory;
a multiplexer connected to said video connector and said set of shift registers for selectively outputting one of the digital video display signals from the video display circuit or said digital video display data output by said set of shift registers; and
a graphics system palette receiving the output of said multiplexer and coupled to the monitor for driving the monitor.

9. The graphics system as set forth in claim 8, wherein the video display circuit includes a video display palette and the host computer may write data into the video display palette at predetermined palette addresses, said graphics system whereby:
said address comparator determines if an address on the system bus is within a predetermined palette address;
said host control logic circuit is connected to said graphics system palette for coupling a palette write via the system bus to said graphics system palette if said address comparator determines the address on the system bus is within a predetermined palette address, whereby writes to the video display palette are shadowed to said graphics processor palette.

10. The graphics system as set forth is claim 9, further comprising:
an interface register having stored therein an indication of whether said graphics system is or is not to be responsive to palette writes by the host system via the system bus; and
said host control logic circuit is connected to said interface register for coupling a palette write via the system bus to said graphics system palette only if said interface register stores an indication that said graphics system is to be responsive to palette writes by the host system via the system bus.

11. A graphics system for connection to a host computer, the host computer having a system bus for transmitting memory accesses via addresses within a predetermined system memory space and a video graphics array (VGA) generating output video data for video enhanced display on a monitor, said graphics system comprising:
a graphics processor for manipulating graphics data;
a local bus coupled to said graphics processor;
a host interface circuit coupled between said local bus and said system bus and providing a communication path therebetween;
a local memory coupled to said local bus for providing a local memory space for storing data and access of said stored data;
a VGA connector for receiving the output of the VGA;
a video connector coupled to said monitor;
a palette circuit coupled to said local bus and said video connector for driving said monitor; and
a multiplexer coupled to said VGA connector, said video connector and said local memory for coupling one of the outputs of the VGA and said local memory to said video connector.

12. The graphics system as set forth in claim 11, wherein said host interface circuit includes memory mapped interface means for interface between the host computer system bus and said local bus.

13. The graphics system as set forth in claim 12, wherein said memory mapped interface means further includes:
means for determining the base address of a block of predetermined amount of free memory space in the system memory space;
a base register for storing said base address; and
means for mapping said local memory space into the system memory space starting at said base address stored in said base register.

14. The graphics system as set forth in claim 13, further comprising:
a first mapping register for storing a first address pointing to a first block of memory in said local memory space;
a second mapping register for storing a second address pointing to a second block of memory in said local memory space; and
means for mapping said first and second blocks of memory into corresponding first and second predetermined locations in the predetermined block of free system memory space starting at said base address stored in said base register.

15. The graphics system as set forth in claim 14, wherein said first and second blocks of memory may be contiguous, noncontiguous, or overlapping.

16. The graphics system as set forth in claim 13, wherein:
said means for mapping said local memory space into the system memory space includes an address comparator connected to the system bus and said base register for determining if an address on the system bus is within said predetermined block of addresses starting at said base address, and couples a memory access via the system bus to said local memory if said address comparator determines the address on the system bus is within said predetermined block of addresses starting at said base address.

17. The graphics system as set forth in claim 16, wherein:
said address comparator compares a predetermined first set of address bits of the address on the system bus with a corresponding second set of bits stored in said base register and determines said address on the system bus is within said predetermined block of addresses starting at said base address only if said first and second sets of bits are identical.

18. The graphics system as set forth is claim 16, further comprising:
an interface register having stored therein an indication of whether said graphics system is or is not to be responsive to the host system via the system bus; and
said host control logic circuit is connected to said interface register for coupling a memory access via the system bus to said local memory only if said interface register stores an indication that said graphics system is to be responsive to the host system via the system bus.

19. The graphics system as set forth is claim 16, further comprising:
an interface register having stored therein an indication of the data width of transfers between said graphics system and the system bus; and
said host control logic circuit is connected to said interface register for enabling a memory access via the system bus having the data width indicated by said interface register.

20. The graphics system as set forth is claim 16, further comprising:
an interface register having stored therein a one bit indication of whether said graphics system responds to an upper half or lower half of said predetermined block of addresses starting at said base address; and
said address comparator is connected to said interface register and compares a predetermined bit of the address on the system bus with a said one bit of said interface register and determines said address on the system bus is within said predetermined block of addresses starting at said base address only if said predetermined bit of the address on the system bus matches said one bit of said interface register.

21. The graphics system as set forth is claim 16, wherein:
said local memory stores at predetermined addresses digital video display data corresponding to a video image;
said graphics system further comprises
a set of shift registers having an input coupled to said local memory for receiving digital video display data recalled from said local memory;
said multiplexer is further connected to said set of shift registers for selectively outputting one of the digital video display signals from the video graphics array or said digital video display data output by said set of shift registers.

22. The graphics system as set forth in claim 21, wherein the video display circuit includes a video display palette and the host computer may write data into the video display palette at predetermined palette addresses, said graphics system whereby:
said address comparator determines if an address on the system bus is within a predetermined palette address;
said host control logic circuit is connected to said graphics system palette for coupling a palette write via the system bus to said graphics system palette if said address comparator determines the address on the system bus is within a predetermined palette address, whereby writes to the video display palette are shadowed to said graphics processor palette.

23. The graphics system as set forth is claim 22, further comprising:
an interface register having stored therein an indication of whether said graphics system is or is not to be responsive to palette writes by the host system via the system bus; and
said host control logic circuit is connected to said interface register for coupling a palette write via the system bus to said graphics system palette only if said interface register stores an indication that said graphics system is to be responsive to palette writes by the host system via the system bus.

24. A method for interfacing a host computer and a graphics system, the host computer having a system bus for transmitting memory accesses via addresses within a predetermined system memory space and a video graphics array (VGA) for generating digital video display signals for display on a monitor, and graphics system connected to the system bus and having local memory space for storing video display signals, the method comprising the steps of:
determining the base address of a block of predetermined amount of free memory within the system memory space;
storing said base address;
mapping the local memory space into the system memory space starting at said base address;
selectively driving the monitor by digital video display signals from either the video graphics array or the local memory space.

25. The method as set forth in claim 24, further comprising the steps of:
storing a first address pointing to a first block of memory in the local memory space;
storing a second address pointing to a second block of memory in the local memory space; and
mapping said first and second blocks of memory into corresponding first and second predetermined locations in said block of free system memory space as determined by said base address.

26. The method as set forth in claim 24, wherein the host computer may write to VGA palette at predetermined palette addresses and the graphics system includes a graphics system palette receiving said selected video display signals and driving the monitor, the method further comprising the steps of:
determining if an address on the system bus is within a predetermined palette address;
said host control logic circuit is connected to said graphics system palette for coupling a palette write via the system bus to said graphics system palette if it is determined that an address on the system bus is within a predetermined palette address, whereby writes to the video display palette are shadowed to said graphics processor palette.

* * * * *